United States Patent [19]

Carbonaro et al.

[11] 4,436,884

[45] Mar. 13, 1984

[54] PROCESS FOR POLYMERISING CONJUGATE DIOLEFINS, AND MEANS SUITABLE FOR THIS PURPOSE

[75] Inventors: Antonio Carbonaro, Milan; Luciano Ripani, S. Donato Milanese, both of Italy

[73] Assignee: Enoxy Chimica, S.p.A., Sassari, Italy

[21] Appl. No.: 484,955

[22] Filed: Apr. 14, 1983

[30] Foreign Application Priority Data

Apr. 15, 1982 [IT] Italy ................................ 20747 A/82

[51] Int. Cl.$^3$ .............................................. C08F 4/52
[52] U.S. Cl. ..................................... 526/111; 526/92; 502/154
[58] Field of Search .................. 526/92, 98, 100, 111, 526/137, 138, 142; 252/429 R, 429 B, 430

[56] References Cited

U.S. PATENT DOCUMENTS

| | | | |
|---|---|---|---|
| 3,803,053 | 4/1974 | Yoo | 252/429 B |
| 4,242,232 | 12/1980 | Sylvester | 526/137 |
| 4,299,937 | 11/1981 | Columberg | 526/142 |
| 4,384,982 | 5/1983 | Martin | 252/429 B |

*Primary Examiner*—Paul R. Michl
*Attorney, Agent, or Firm*—Hedman, Gibson, Costigan & Hoare

[57] ABSTRACT

A new process is described for polymerising and copolymerising conjugate diolefins, characterised by using a catalytic system formed from at least one metal pertaining to Group III B of the Periodic System, at least one non-halogenated aluminium alkyl, at least one organic halogen derivative or a halide of an element also able to exist in a lower valency state, and at least one compound containing one or more salifiable hydroxyl groups, i.e. of acid or neutral type. The new process allows the preparation, both in the absence and in the presence of inert diluents, of conjugate diolefin polymers of linear structure which are essentially entirely 1,4-cis. The method for preparing the new catalytic system is also described.

14 Claims, No Drawings

PROCESS FOR POLYMERIZING CONJUGATE DIOLEFINS, AND MEANS SUITABLE FOR THIS PURPOSE

Catalysts prepared from compounds of elements pertaining to Group III B of the Periodic System are known to be active in the polymerisation of conjugate diolefins.

The patent literature contains precise information on the use of compounds of the lanthanum series which are formed either from mono or bivalent bidentate organic ligands (chelates) (see U.S. Pat. Nos. 3,297,667 and 3,794,604), or from monovalent monodentate ligands (see patents Be 869,438, DOS 2,830,080 and DOS 2,848,964).

Not all the compounds indicated in the prior art are stable and/or easily accessible. Their preparation often requires numerous successive reactions and laborious treatment.

The association of said compounds with others of an organo-metallic nature such as aluminium alkyls excludes the presence of reagents such as oxygen, water, carboxylic alcohols or carboxylic acids normally used for deactivating the catalyst (see for example the patent applications DOS No. 2,830,080 and DOS No. 2,848,964).

It is therefore considered essential that both the monomer and the diluent are carefully purified of every reactive impurity, and in particular are dried in order to remove the water dissolved in them. We have now surprisingly found that it is possible to polymerise and copolymerise conjugate diolefins into linear products of substantially entirely 1,4-cis structure by bringing them into contact with a catalytic system prepared by reacting together the following components under the conditions and in the manner specified hereinafter:

(a) at least one of the elements pertaining to Group III B of the periodic system in finely divided form;
(b) at least one aluminium compound of formula $AlR_2R'$ where R is alkyl, cycloalkyl or alkylaryl, and R' is R or H;
(c) at least one organic halogen derivative or a halide of an element able to exist in at least two valency states, the halide corresponding to a state which is superior than the minimum state;
(d) at least one compound containing one or more salifiable hydroxyl groups such as water, carboxylic alcohols or carboxylic acids.

Such catalysts are new and innovative.

The components of type (a) are the elements in their metal state. As they must be in a very reactive form, they should be finely divided by vacuum vaporisation at a residual pressure of between $10^{-1}$ and $10^{-6}$ torr, then condensed at low temperature (between $-20°$ and $-200°$ C.) on to a support constituted by component (c) either in its pure state or diluted in a saturated or unsaturated aliphatic hydrocarbon. The reaction between (a) and (c) is then completed either at ambient temperature, or, according to the nature of (c), by raising the suspension to a higher temperature (eg. up to 100° C.) for a few minutes.

The preferred elements of Group III B include neodymium, praesodymium and cerium.

As stated, c can be organic or inorganic. Particularly suitable organic halogen derivatives are allyl chloride and bromide, crotyl chloride and bromide, methallyl chloride and bromide, benzyl chloride and bromide, and tert-butyl chloride and bromide. The halides of elements able to exist in more than one valency state include tin tetrachloride, antimony pentachloride, and chlorides and bromides of phosphorus, phosphoryl, sulphuryl etc.

The reaction of a and c with the other catalytic components and with the monomer or monomers can be effected under various conditions and in various ways, always with positive results. However, the preferred methods of operation include reacting b, d and finally the monomers successively either in the presence or in the absence of an inert diluent.

To attain the objectives of the present invention, the reaction between the aforesaid components is carried out in accordance with the following molar proportions: component b/component a greater than 20 and preferably between 30 and 200; component c/component a greater than 0.1 and preferably between 0.5 and 3; component d/component a greater than 1 and preferably between 4 and 100.

Water, which is little soluble in aliphatic hydrocarbons, is fairly soluble in diolefins in the liquid state and can therefore be introduced in this way. We have however surprisingly found that even water dispersed as droplets in a hydrocarbon medium performs its co-catalytic action. The same is valid for carboxylic alcohols and acids.

The advantage offered by the direct use of metals is supplemented by further advantages relating to the manner in which the process according to the present invention is carried out. For example, it is possible to use monomers and possibly diluents, while dispensing with any treatment directed towards removing the water and all the hydroxylated impurities contained in them.

A further advantage is that by suitably choosing the transition metal as initially indicated, it is possible to obtain conjugate diolefin polymers having a linear structure, a high molecular weight and a content of 1,4-cis structural units exceeding 90%, and habitually exceeding 97%.

The use of an inert diluent is not strictly necessary, as it is possible to also control the polymerisation in the complete absence thereof. If it is preferred to use the diluent, this can be a hydrocarbon solvent, preferably aliphatic or cycloaliphatic.

The polymerisation temperature is not critical, and can therefore be chosen within a very wide range extending for example from 0° C. to 200° C. and beyond. It does not substantially influence the characteristics of the polymer, except for its mean molecular weight and the molecular weight distribution.

The monomer can be converted completely into polymer in the absence of diluents.

Further advantages are the non-critical nature of the temperature, and that even under bulk operation conjugate diolefin copolymers are obtained having a high content of 1,4-cis units together with controlled molecular weights, and a linear structure which makes them perfectly soluble even in aliphatic hydrocarbons and in the monomers themselves in the liquid state.

The technological, mechanical and elastic properties of the polymer products are excellent even after curing, the content of 1,4-cis units being always very high ($\geq 98\%$) and the structure being perfectly linear.

The melting point of polybutadiene is for example among the highest ever observed, namely between $+3°$ and +7° C. (measured at the peak of the DSC spectrum).

Monomers which can be polymerised by the process herein described comprise all conjugate diolefins, and particularly 1,3-butadiene, 1,3-pentadiene and isoprene. Copolymers of two or more of the said monomers are interesting because of their microstructure which is essentially entirely of 1,4-cis type, and because of the statistical distribution of the monomer units.

All operating details will be apparent from the following examples, the purpose of which is to merely illustrate the invention without limiting its scope.

EXAMPLE 1

A rotaty evaporator is used, provided with a 1 liter flask disposed horizontally and immersed in a liquid air bath. A crucible formed from a tungsten spiral is disposed in the centre of the flask and is connected to a 10 kWh electrical supply. The spiral is covered with sintered $Al_2O_3$.

The apparatus is provided with a nitrogen and vacuum connection.

About 200 mg of neodymium in pieces are placed in the crucible, and 100 ml of kerosine of B.P. 180°–210° C. and 0.5 ml of allyl chloride are fed into the flask.

After cooling the flask, vacuum is applied to the apparatus ($10^{-3}$ torr), then the spiral is heated electrically until vaporisation occurs (violet metal vapour is formed).

Nitrogen is fed, and the flask is allowed to reach ambient temperature under agitation, before heating it mildly (50° C., 30 min).

The analysis of the suspension gives Nd $3.10^{-3}$ M.

16.5 ml of said suspension are placed in a 200 ml drink bottle, and 2.5 mmoles of $Al(i.C_4H_9)_2H$ and a mixture of 8.8 ml of isoprene and 60 g of butadiene containing 3.6 mg of dissolved $H_2O$ (0.2 mmoles) are added under a $N_2$ atmosphere.

The bottle is corked and placed in a bath temperature-controlled at 30° C. The reaction mixture is agitated by a magnetic anchor previously placed in the bottle. After 3 hours, an excess of alcohol is added, and the polymer which thus coagulates is isolated. Dry product: 4 g. I.R. analysis indicates the presence of 6% of isoprene units and a total content of 1,4-cis units 98.9%. The melting point measured by DSC is −5° C.

EXAMPLE 2

Operating as described in Ex. 1, 180 mg of neodymium are vaporised under vacuum and condensed on the cold walls (−190° C.) of the flask in which 100 ml of kerosine and 0.7 ml of $SnCl_4$ have been placed. The flask is firstly allowed to rise to ambient temperature, and is then heated to 80° C. for 5 minutes.

Elementary analysis of the suspension shows that the Nd molarity is $3.5 \times 10^{-3}$.

Said suspension is used for a butadiene polymerisation test carried out in a steel autoclave of 1 liter capacity provided with mechanical stirring and temperature control. 350 g of butadiene are drawn into the autoclave by suction.

The catalyst is prepared separately in a glass test tube by reacting 75 ml of the aforesaid suspension (0.26 mmoles of Nd) with 10.4 mmoles of $Al(i.C_4H_9)_2H$ and 63 mg of $H_2O$.

The catalyst thus formed is added to the butadiene present in the autoclave which has already been heated to a controlled temperature of 50° C.

The reaction is prolonged under stirring for two hours at said temperature.

After removing the excess butadiene, a polymer mass is discharged from the cooled autoclave and after drying under vacuum weighs 285 g.

IR analysis shows the presence of 1,4-cis butadiene units to the extent of 97.5%. The $[\eta]$ in toluene at 30° is 3.8 dl/g, and the $T_m$ measured by DSC is +4° C.

We claim:
1. A catalytic system for polymerising conjugate diolefins, prepared from:
   (a) at least one of the elements pertaining to Group III B of the periodic system;
   (b) at least one aluminium compound of formula $AlR_2R'$ where R is alkyl, cycloalkyl or alkylaryl, and R' is R or H;
   (c) at least one organic halogen derivative or a halide of an element able to exist in at least two valency states, the halide corresponding to a state higher than the minimum;
   (d) at least one compound containing one or more salifiable hydroxyl groups such as water, carboxylic alcohols or carboxylic acids.
2. A catalytic system as claimed in claim 1, characterised in that component a is preferably chosen from cerium, praesodymium and neodymium.
3. A catalytic system as claimed in claim 1, characterised in that component c is preferably chosen from allyl chloride and bromide, crotyl chloride and bromide, methallyl chloride and bromide, benzyl chloride and bromide, tert-butyl chloride and bromide, tin tetrachloride, antimony pentachloride, and the chloride and bromide of phosphorus, phosphoryl and sulphuryl.
4. A catalytic system as claimed in claim 1, characterised in that the molar ratio of component b to component a exceeds 20.
5. A catalytic system as claimed in claim 4, characterised in that the molar ratio of component b to component a preferably lies between 30 and 200.
6. A catalytic system as claimed in claim 1, characterised in that the molar ratio of component c to component a exceeds 0.1.
7. A catalytic system as claimed in claim 6, characterised in that the molar ratio of component c to component a preferably lies between 0.5 and 3.
8. A catalytic system as claimed in claim 1, characterised in that the molar ratio of component d to component a preferably lies between 4 to 100.
9. A method for preparing the catalytic system as claimed in claim 1, consisting of vaporising component a under vacuum in the metal state, and condensing the vapours thus obtained with component c of the catalytic system.
10. A method as claimed in claim 9, characterised in that the metal is vaporised at a vacuum of between $10^{-1}$ and $10^{-6}$ torr.
11. A method as claimed in claim 10, characterised in that contact between the vapours of component a and component c takes place at a temperature of between −20° and −200° C., and the reaction is completed at a temperature of between 20° and 100° C.
12. A method as claimed in claim 11, characterised in that the reaction between the vapours of component a and component c takes place in the presence of a saturated or unsaturated aliphatic hydrocarbon diluent.
13. A process for polymerising and copolymerising conjugate diolefins, consisting of carrying out the reaction in the presence of the catalytic system as claimed in claim 1.
14. A process as claimed in claim 13 characterised in that the conjugate diolefin is preferably chosen from butadiene, isoprene and piperylene.

* * * * *